(12) United States Patent
Kijima

(10) Patent No.: US 11,615,705 B2
(45) Date of Patent: Mar. 28, 2023

(54) VEHICLE CONTROL APPARATUS

(71) Applicant: TOYOTA JIDOSHA KABUSHIKI KAISHA, Toyota (JP)

(72) Inventor: Yoshitaka Kijima, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 323 days.

(21) Appl. No.: 17/148,950

(22) Filed: Jan. 14, 2021

(65) Prior Publication Data

US 2021/0247526 A1 Aug. 12, 2021

(30) Foreign Application Priority Data

Feb. 10, 2020 (JP) ................................ JP2020-20914

(51) Int. Cl.
| | |
|---|---|
| *G01S 19/45* | (2010.01) |
| *G08G 1/0962* | (2006.01) |
| *B60K 35/00* | (2006.01) |
| *G01C 21/28* | (2006.01) |
| *G08G 1/04* | (2006.01) |
| *G08G 1/052* | (2006.01) |
| *G06V 10/80* | (2022.01) |
| *G06V 20/58* | (2022.01) |

(52) U.S. Cl.
CPC ........... *G08G 1/0962* (2013.01); *B60K 35/00* (2013.01); *G01C 21/28* (2013.01); *G01S 19/45* (2013.01); *G06V 10/803* (2022.01); *G06V 20/582* (2022.01); *G08G 1/04* (2013.01); *G08G 1/052* (2013.01); *B60K 2370/167* (2019.05)

(58) Field of Classification Search
CPC ... G01S 19/45; B60K 35/00; B60K 2370/167; G01C 21/28; G08G 1/04; G08G 1/052; G08G 1/09623; G08G 1/09626; G08G 1/0962; G06F 18/251; G06V 10/803; G06V 20/582; B60W 60/001; B60W 2555/60
See application file for complete search history.

(56) References Cited

U.S. PATENT DOCUMENTS

| | | |
|---|---|---|
| 2012/0245832 A1 | 9/2012 | Meis et al. |
| 2015/0220769 A1 | 8/2015 | Yokoi |
| 2019/0122550 A1* | 4/2019 | Muehlmann ..... G08G 1/096725 |

FOREIGN PATENT DOCUMENTS

JP 2015146119 A 8/2015

* cited by examiner

*Primary Examiner* — Yuen Wong
(74) *Attorney, Agent, or Firm* — Dickinson Wright, PLLC

(57) ABSTRACT

A vehicle control apparatus determines a travelling region in which the vehicle is travelling among a plurality of regions into which an area is divided by a predetermined boundary line. When an obtained position which is determined based on a positioning signal from a positioning satellite is not included in a boundary zone, the apparatus determines that the travelling region is a region in which the obtained position is included. The boundary zone is a belt-like zone including the boundary line. Meanwhile, when the obtained position is not included in the boundary zone, the apparatus determines the travelling region based on a piece of information included in an image of an area in front of the vehicle. Each piece of the information is associated with one of the regions having a part overlapping the boundary zone.

4 Claims, 5 Drawing Sheets

VEHICLE CONTROL APPARATUS

TECHNICAL FIELD

The present disclosure relates to a vehicle control apparatus which determines a region in which a vehicle is travelling and executes a driving assistance process corresponding to the determined region.

BACKGROUND

A conventionally known vehicle control apparatus (hereinafter also referred to as the "conventional apparatus") of this kind detects a traffic sign (road sign; specifically, "no overtaking" (no passing zone) sign) on the basis of an image captured by a camera mounted on a vehicle, and determines (identifies; specifies) a country (region) in which the vehicle is travelling. Hereinafter, a country (state; region) in which the vehicle is travelling is also referred to as a "travelling region."

Furthermore, the conventional apparatus determines a timing of generating an alert to a driver of the vehicle, depending on (based on) whether a distance unit used in the travelling region is kilometer or mile.

In addition, when a lane change from an "own lane" in which the vehicle is running to an "adjacent lane" which is a lane adjacent to the own lane is performed, the conventional apparatus determines whether the own lane is a travelling lane or an overtaking lane on the basis of whether the travelling region is a region in which left-side driving (left-hand traffic) is mandatory or a region in which right-side driving (right-hand traffic) is mandatory, and determines what kind of alerts should be generated on the basis of that determination result (see, for example, Japanese Patent Application Laid-Open (kokai) No. 2015-146119).

SUMMARY

The conventional apparatus does not update the travelling region in a time period from a point in time when the vehicle passes through a border of the region (i.e., when the travelling region changes) to a point in time when the "no overtaking" sign is detected. Accordingly, there is a probability that a time period in which the travelling region that has been recognized by the conventional apparatus is different from the actual travelling region is very long. In other words, a time period in which an erroneous determination on the travelling region continues may be sometimes very long.

Meanwhile, it is conceivable to determine the travelling region on the basis of a position of the vehicle (hereinafter, also referred to as a "obtained position") acquired using a positioning signal transmitted from positioning satellites. However, there may be cases where a difference between an actual position of the vehicle and the obtained position (i.e., an error in obtaining the obtained position) is relatively large. Accordingly, when the vehicle is travelling near the border of countries (or states) while the error in obtaining the obtained position is relatively large, there is a high possibility that the erroneous determination on the travelling region is made.

In view of the forgoing, one object of the present disclosure is to disclose a vehicle control apparatus that can reduce a possibility of making the erroneous determination on the travelling region due to the error in obtaining the obtained position, and can avoid an occurrence of a case where a time period from a point in time when the travelling region actually changes to a point in time when that changed travelling region is newly obtained as the updated travelling region is excessively long, so as to be able to execute the driving assistance process more appropriately in accordance with the actual travelling region.

A vehicle control apparatus for achieving the above-described object (hereinafter, also referred to as "the apparatus of the present disclosure") comprises a receiving apparatus, a camera apparatus, and a control unit. The control unit may be implemented by at least one programmed processor whose operation is determined by a predetermined program, gate arrays, or the like.

The receiving apparatus (33) receives a positioning signal from a positioning satellite for determining a position of a vehicle (10).

The camera apparatus (32) obtains a "front image" by photographing an area in front of the vehicle.

The control unit (drive assistance ECU 20) is configured to determine, based on an obtained position (Pn) of the vehicle and the front image, a "travelling region" in which the vehicle is travelling among a plurality of regions into which an area is divided by a predetermined "boundary line," the obtained position being a position obtained using the positioning signal received by the receiving apparatus.

In addition, the control unit is configured to execute a "driving assistance process" in accordance with the travelling region which has been determined.

Furthermore, the control unit is configured to have stored, in advance, "boundary zone information" and plural pieces of "information-for-determining-region," the boundary zone information defining a "boundary zone" that is a belt-like zone including the boundary line, and each piece of the information-for-determining-region being associated with one of the regions having a part overlapping the boundary zone.

In addition, the control unit is configured to determine whether the obtained position is included in the boundary zone on the basis of the boundary zone information.

The control unit is configured to determine that the travelling region is a region in which the obtained position is included when it is determined that the obtained position is not included in the boundary zone (step 550 in FIG. 5). Meanwhile, the control unit is configured to determine that the travelling region is a region associated with a piece of the information-for-determining-region which has been determined to be included in the front image when it is determined that the obtained position is included in the boundary zone (step 515 to 525 in FIG. 5).

The boundary zone is, for example, defined such that a distance between a boundary line (as an example, an international border line) of regions and a fringe of the boundary zone (i.e., fringe being a boundary between the boundary zone and a center region described later) is greater than the maximum value of the error in obtaining the obtained position in most cases. The boundary zone is, for example, is a strip-shaped (belt-like) area including the boundary.

When the obtained position is not included in the boundary zone, the apparatus of the present disclosure determines the travelling region on the basis of the obtained position, since it is unlikely that the erroneous determination of the travelling region due to the error in obtaining the obtained position occurs. Whereas, when the obtained position is included in the boundary zone, the apparatus of the present disclosure determines the travelling region on the basis of the information-for-determining-region contained in the front image, since it is likely that the erroneous determination of the travelling region due to the error in obtaining the obtained position occurs.

Each piece of the information-for-determining-region is, for example, information about an object specific or unique to each of regions (as an example, a characteristic traffic sign used in a certain region) which can be extracted from the front image. In this case, a template representing optical characteristics of the object have been stored as the information-for-determining-region in advance. When an area (image range) corresponding (similar) to the template is detected from the front image, it is determined that the information-for-determining-region associated with that template is included in the front image. Namely, the information-for-determining-region may be information about an object associated with the region.

After the vehicle crossed over (passed through) the boundary line of the regions (i.e., the travelling region is changed), the apparatus of the present disclosure detects the change of the travelling region when the information-for-determining-region is detected from the front image. In addition, after the vehicle crossed over the boundary line, the apparatus of the present disclosure detects the change of the travelling region on the basis of the obtained position when the obtained position is out of the boundary zone regardless of whether or not the information-for-determining-region is detected. Therefore, the apparatus of the present disclosure can reduce the possibility of occurring the erroneous determination of the travelling region due to the error in obtaining the obtained position, and reduce an occurrence of the case where a time period from a point in time when the travelling region is actually changed to a point in time when that changed travelling region is newly obtained as the updated travelling region becomes excessively long.

In one aspect of the apparatus of the present disclosure, the control unit is configured to have stored information on a plurality of positions of reference points for defining the boundary zone as the information-for-determining-region.

In actuality, the boundary lines of regions are complex curved lines (more specifically, lines including many curvatures) in many cases. Accordingly, in order to store map information related to the boundary lines of regions in detail, a large-capacity of storage device is required. Meanwhile, the boundary lines of the boundary zone do not have to be defined by curved lines as complex as the boundary lines of the regions. For example, the boundary line of the boundary zone may be defined by a set of line segments connecting between the reference points. Therefore, according to the present aspect, the capacity of the storage device for storing the boundary zone information can be reduced.

In still another aspect of the apparatus of the present disclosure, the control unit is configured to have stored information representing traffic signs indicating traffic regulations as the information-for-determining-region, wherein one of the traffic signs used in one of the regions having a part overlapping the boundary zone has a design different from a design of another one of the traffic signs used in another one of the regions having a part overlapping the boundary zone.

In general, design (specifically, shapes, colors, and so on) of the traffic sign has been fixed. Accordingly, it is easy to detect (extract) the traffic sign from the front image with high accuracy by means of a well-known image processing in many cases. Therefore, according to the present aspect, it is possible to detect the information-for-determining-region contained in the front image with high accuracy.

In still another aspect of the apparatus of the present disclosure (second aspect), the control unit is configured to execute a process for indicating a travelling speed of the vehicle on a display apparatus installed on the vehicle together with a unit of speed employed in the determined travelling region as the driving assistance process.

According to the present aspect, the vehicle speed displayed on the display apparatus of the vehicle is controlled (switched) on the basis of the unit of speed (namely, either kilometers per hour (km/h) or miles per hour (mi/h)) used/employed in the travelling region of the vehicle. Therefore, occurrence of a case where the vehicle speed is displayed with the unit of speed which is not used in the travelling region of the vehicle, and thereby, a case where a driver of the vehicle feels uncomfortable (due to the displayed vehicle speed along with the wrong speed unit) can be avoided.

Notably, in the above description, in order to facilitate understanding of the present disclosure, the constituent elements of the disclosure corresponding to those of an embodiment of the disclosure which will be described later are accompanied by parenthesized names and/or symbols which are used in the embodiment; however, the constituent elements of the disclosure are not limited to those in the embodiment defined by the names and/or the symbols. Other objects, other features, and attendant advantages of the present disclosure will be readily appreciated from the following description of the embodiment of the disclosure which is made with reference to the accompanying drawings.

DETAILED DESCRIPTION

Figure 1:
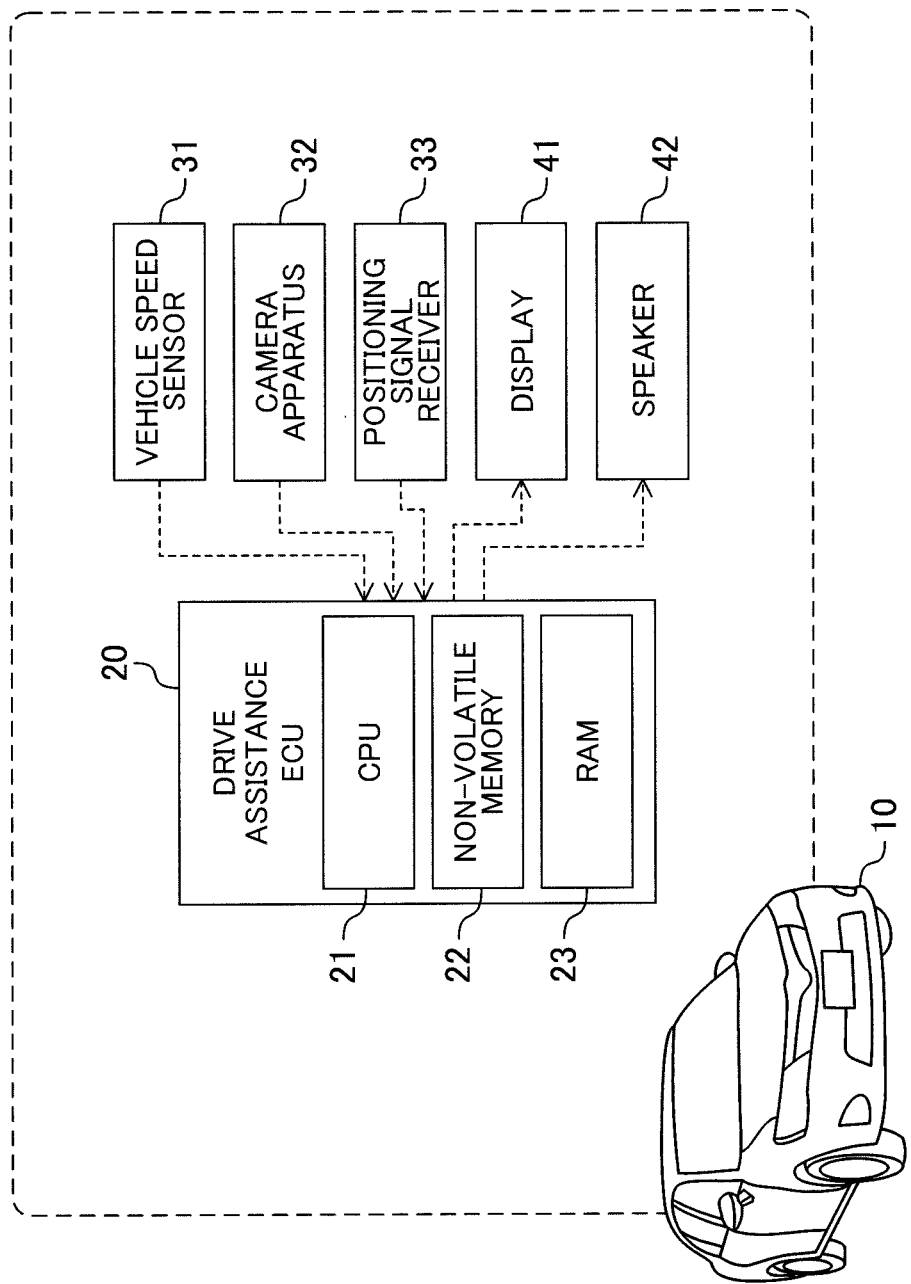
FIG. 1 is a schematic diagram of a vehicle control apparatus (present control apparatus) according to an embodiment of the present disclosure.

A vehicle control apparatus according to an embodiment of the present disclosure (hereinafter also referred to as the "present control apparatus") will now be described with reference to the drawings. It can be said that the present control apparatus includes a travelling region determination apparatus for determining a travelling region which is a region in which a vehicle is travelling/located. The present control apparatus is applied to a vehicle 10 shown in FIG. 1, and includes a drive assistance ECU 20 which is an Electronic Control Unit (ECU). Hereinafter, the drive assistance ECU 20 is also referred to as the ECU 20 for simplification.

The ECU 20 includes a micro-computer, as a major component, which includes a CPU 21, a non-volatile memory 22, and a RAM 23. The CPU 21 performs data reading, numerical computation, computation result output, and so on by repeatedly executing predetermined programs (routines).

The non-volatile memory 22 is formed by a ROM and a rewritable flash memory. The non-volatile memory 22 stores the programs executed by the CPU 21, lookup tables (maps)

read by the CPU 21 during execution of the programs, or the like. The RAM 23 stores data read by the CPU 21 temporarily.

The ECU 20 is connected to a vehicle speed sensor 31, a camera apparatus 32, a positioning signal receiver 33, a display 41, and a speaker 42. The vehicle speed sensor 31 detects a vehicle speed Vt which is a speed of the vehicle 10 and outputs a signal indicative of the vehicle speed Vt to the ECU 20.

The camera apparatus 32 is disposed at a position on a cabin side of a front windshield of the vehicle 10 near an unillustrated inner rear-view mirror (a room mirror) fixed at a center upper portion of the front windshield. The camera apparatus 32 obtains (captures) an image of an area in front of the vehicle 10 as a "front image" every time a predetermined time interval elapses, and outputs data (i.e., static image data) representing the front image to the ECU 20.

The positioning signal receiver (receiving apparatus) 33 executes a process for receiving positioning signals transmitted from positioning satellites so as to determine/obtain a position Pn of the vehicle 10 that is a present (current) position of the vehicle 10 on the basis of the received positioning signals every time a predetermined time interval elapses. The positioning satellite is a satellite of a satellite navigation system, and is the GPS satellite in this embodiment. The obtained position Pn is represented by a combination of latitude and longitude. The positioning signal receiver 33 outputs a signal indicative of the obtained position Pn to the ECU 20.

The display 41 is an LCD (liquid crystal display) arranged in an instrument panel (not shown) of the vehicle 10. Characters, figures, and the like to be displayed on the display 41 are controlled by the ECU 20. The speaker 42 is disposed in the cabin of the vehicle 10. A warning sound, a voice message and the like played (generated) by the speaker 42 are controlled by the ECU 20.

The ECU 20 executes a "travelling region determination process" for determining (identifying; obtaining) a country or a region in which the vehicle 10 is travelling (hereinafter, also referred to as a travelling region St collectively). Information to which the ECU 20 refers when the ECU 20 executes the travelling region determination process has been stored as "region information" in the non-volatile memory 22 in advance. The region information includes "boundary zone information" and "information-for-determining-region." The ECU 20 determines/specifies the travelling region St through the travelling region determination process, and stores the determined travelling region St in the flash memory included in the non-volatile memory 22. In addition, the ECU 20 executes "driving assistance processes" for assisting a driver to drive the vehicle 10 on the basis of the travelling region St.

(Travelling Region Determination Process)

First, the travelling region determination process will be described. The ECU 20 determines whether or not the obtained position Pn is included in a "boundary zone" described later. When the obtained position Pn is not included in the boundary zone, the ECU 20 determines that the travelling region St is a region corresponding to the obtained position Pn (i.e., a region in which the obtained position Pn is included). The travelling region St corresponds to an area such as a country, a state or an autonomous region. In this specification, the travelling region St can be said to be a geographical range where the same traffic laws and regulations are mandatory.

Notably, hereinafter, a region other than the boundary zone is referred to as a "center region." Therefore, when the obtained position Pn is included in the center region, the ECU 20 determines that the travelling region St is a region corresponding to that center region. In contrast, when the obtained position Pn is not included in the center region, the ECU 20 determines the travelling region St on the basis of the information-for-determining-region as described later.

Figure 2:
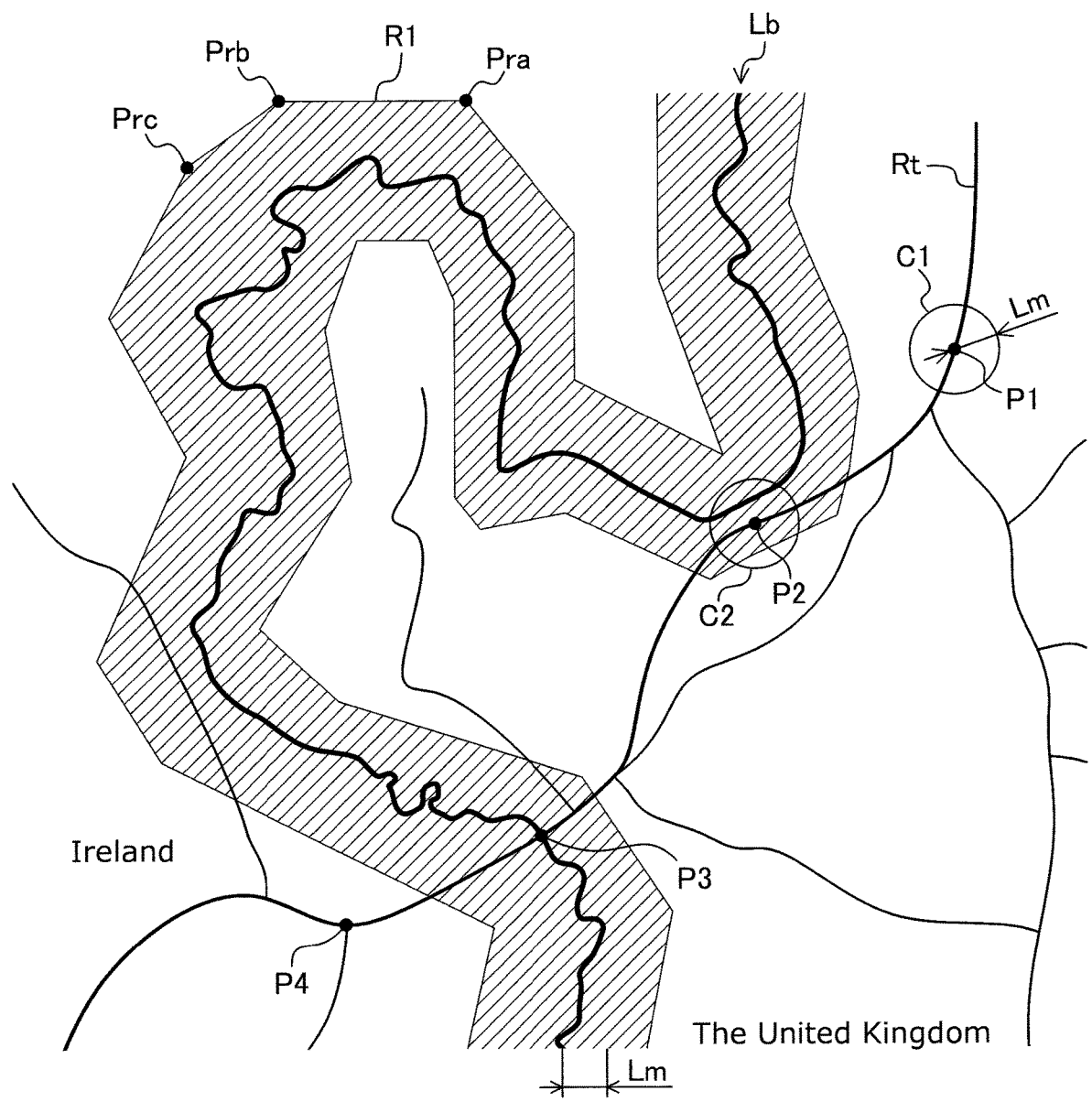
FIG. 2 is a brief map referenced to describe a boundary of regions, a boundary zone and a center region.

The boundary zone will be described with reference to a simplified map shown in FIG. 2. A curved line Lb shown in FIG. 2 indicates a "boundary line" (in this case, an international border line) between the United Kingdom and Ireland. As understood from FIG. 2, an area is divided (partitioned) by the boundary line (i.e., the curved line Lb). The boundary zone is a strip-shaped (belt-like) area that includes/covers the boundary line. In FIG. 2, the boundary zone is the hatched area/region R1. The regions other than the region R1 are the center regions.

In the present embodiment, the boundary zone is defined (determined) by a set of line segments and a plurality of predetermined points/positions. Each of the line segments connects two adjacent points/positions with each other. The points/positions are referred to as "reference points" for convenience' sake. A point Pra, a point Prb and a point Prc are examples of the reference points for defining a part of the region R1. The above mentioned "boundary zone information" is the information regarding the boundary zone and the center region that are defined by the reference points.

As shown in FIG. 2, the boundary zone is defined such that a "distance from the boundary line to each demarcation line (i.e., a line corresponding to the line segment)" is greater than a predetermined margin distance Lm. The demarcation line is a partition line between the boundary zone and the center region. The margin distance Lm has been determined in advance such that the margin distance Lm is a value greater than the maximum value of errors in obtaining the obtained position Pn in most cases. Accordingly, it is very unlikely that a distance between an actual position of the vehicle 10 and the obtained position Pn (i.e., the error in obtaining the obtained position Pn) is greater than the margin distance Lm.

Therefore, the ECU 20 determines that the travelling region St is a region in which the obtained position Pn is included, when the obtained position Pn is included in the center region (i.e., the obtained position Pn is not included in the boundary zone). In this case, a possibility of erroneously obtaining the travelling region St is extremely small.

In contrast, when the obtained position Pn is included in the boundary zone, there is a possibility that a "region (region a) in which the obtained position Pn is included" and a "region (region 13) in which the vehicle 10 is actually travelling" are different from each other (namely, there may be the boundary line between the region a and the region (3). Accordingly, in this case, if the ECU 20 determines that the travelling region St is a region in which the obtained position Pn is included, the determined travelling region St may be incorrect (namely, a region in which the vehicle 10 is not actually travelling may be obtained as the travelling region St). In view of this, when the obtained position Pn is included in the boundary zone, the ECU 20 determines (identifies; specifies) the travelling region St on the basis of the information-for-determining-region as described later, regardless of the obtained position Pn.

The information-for-determining-region includes multiple pieces of information (e.g., information of a traffic sign) each of which is associated with one of multiple regions divided by the boundary line. Hereinafter, each of the multiple regions divided by the boundary line is also referred to as a "candidate region." In other words, the candidate region is a region which partially overlaps with the boundary zone. In addition, pieces of the information-for-determining-region associated with the candidate regions each of which partially overlaps with a certain boundary zone are different from each other. The candidate regions with respect to the region R1 are the United Kingdom and Ireland.

Figure 3A:
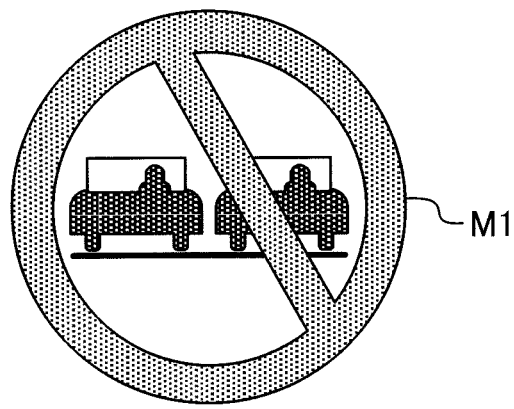
FIG. 3A is a diagram indicating information-for-determining-region associated with the United Kingdom.

The information-for-determining-region associated with the United Kingdom is a traffic sign M1 shown in FIG. 3A. The information-for-determining-region associated with Ireland is a traffic sign M2 shown in FIG. 3B. The traffic sign M1 is "no overtaking" sign placed (used) in the United Kingdom. The traffic sign M2 is "no overtaking" sign placed in Ireland. The traffic sign M1 and the traffic sign M2 have different designs from each other. As understood from the above, an example of the information-for-determining-region is a traffic sign indicating a predetermined traffic regulation (rule) and having a design different among a plurality of the candidate regions.

While the obtained position Pn is included in the region R1, the ECU 20 determines that the travelling region St is the United Kingdom when the traffic sign M1 is detected (extracted) from the front image (namely, when an area (image range) corresponding to a piece of the information-for-determining-region associated with the United Kingdom is included in the front image). Whereas, while the obtained position Pn is included in the region R1, the ECU 20 determines that the travelling region St is Ireland when the traffic sign M2 is detected from the front image.

In order to detect (a piece of) the information-for-determining-region contained in the front image, the ECU 20 executes well-known template matching processing. More specifically, templates have been stored as "region associated templates" in the non-volatile memory 22 of the ECU 20. The each of the stored templates corresponds to the piece of the information-for-determining-region (i.e., optical characteristics of that piece of the information-for-determining-region). Namely, each of the region associated templates corresponds to the boundary zone, and is associated with the candidate region which partially overlaps with that boundary zone.

When the obtained position Pn is included in the boundary zone, the ECU 20 searches for (looks up) the image range, contained in the front image, that is similar to the region associated template corresponding to the candidate regions partially overlapping with that boundary zone (i.e., the ECU 20 searches for an "area in the front image" corresponding to the piece of the information-for-determining-region) by executing the template matching processing. If the image range similar to the region associated template is detected (found out), the ECU 20 determines that the travelling region St is the same as the candidate region corresponding to that region associated template.

Examples of how to determine the travelling region St will nest be described with reference to FIG. 2, for each of a case where the obtained position Pn is included in the center region and a case where the obtained position Pn is included in the boundary zone. A road Rt shown in FIG. 2 passes through the curved line Lb that is the border between the United Kingdom and Ireland. A point P1, a point P2, a point P3, and a point P4 indicate positions on the road Rt. The point P3 indicates a position on the curved line Lb. It is assumed that the vehicle 10 travels from the point P1 to the point P4 via the point P2 and the point P3.

A reference circle C1 shown in FIG. 2 is a circle whose center is located at the point P1 and whose radius is the margin distance Lm. The entire circle C1 is included in the center region of the United Kingdom. When the vehicle 10 is located at the point P1, the obtained position Pn is included in the reference circle C1 in most cases. Accordingly, the obtained position Pn that is obtained when the vehicle 10 is located at the point P1 is always included in the center region of the United Kingdom (i.e., the obtained position Pn is not included in the region R1), and thus, the ECU 20 determines that the travelling region St is the United Kingdom on the basis of the obtained position Pn.

A reference circle C2 is a circle whose center is located at the point P2 and whose radius is the margin distance Lm. As understood from the circle C2, when the vehicle 10 is located at the point P2, the obtained position Pn is included in any one of the center region of the United Kingdom, a region of the United Kingdom included in the region R1, and a region of Ireland included in the region R1.

If the obtained position Pn is included in the center region of the United Kingdom, the ECU 20 determines that the travelling region St is the United Kingdom on the basis of the obtained position Pn. Whereas, if the obtained position Pn is included in the region R1, the ECU 20 determines that the travelling region St is the United Kingdom on the basis of the front image when the traffic sign M1 is detected from the front image.

Notably, even if the obtained position Pn is included in the region of Ireland included in the region R1, the traffic sign M2 is not detected from the front image. Thus, a case in which the ECU 20 determines that the travelling region St is Ireland (i.e., an erroneous determination of the travelling region St) does not occur.

When the vehicle 10 passes through the point P3 (i.e., the vehicle 10 enters Ireland), the obtained position Pn is included in either the region of the United Kingdom included in the region R1, or the region of Ireland included in the region R1. When the traffic sign M2 is detected from the front image for the first time after the vehicle 10 passed through the point P3, the ECU 20 determines that the travelling region St is Ireland on the basis of the front image.

Alternatively, after the vehicle 10 passed through the point P3, the ECU 20 determines that the travelling region St is Ireland on the basis of the obtained position Pn when a case in which the obtained position Pn is included in the center region of Ireland occurs before the traffic sign M2 is detected from the front image.

Figure 4:
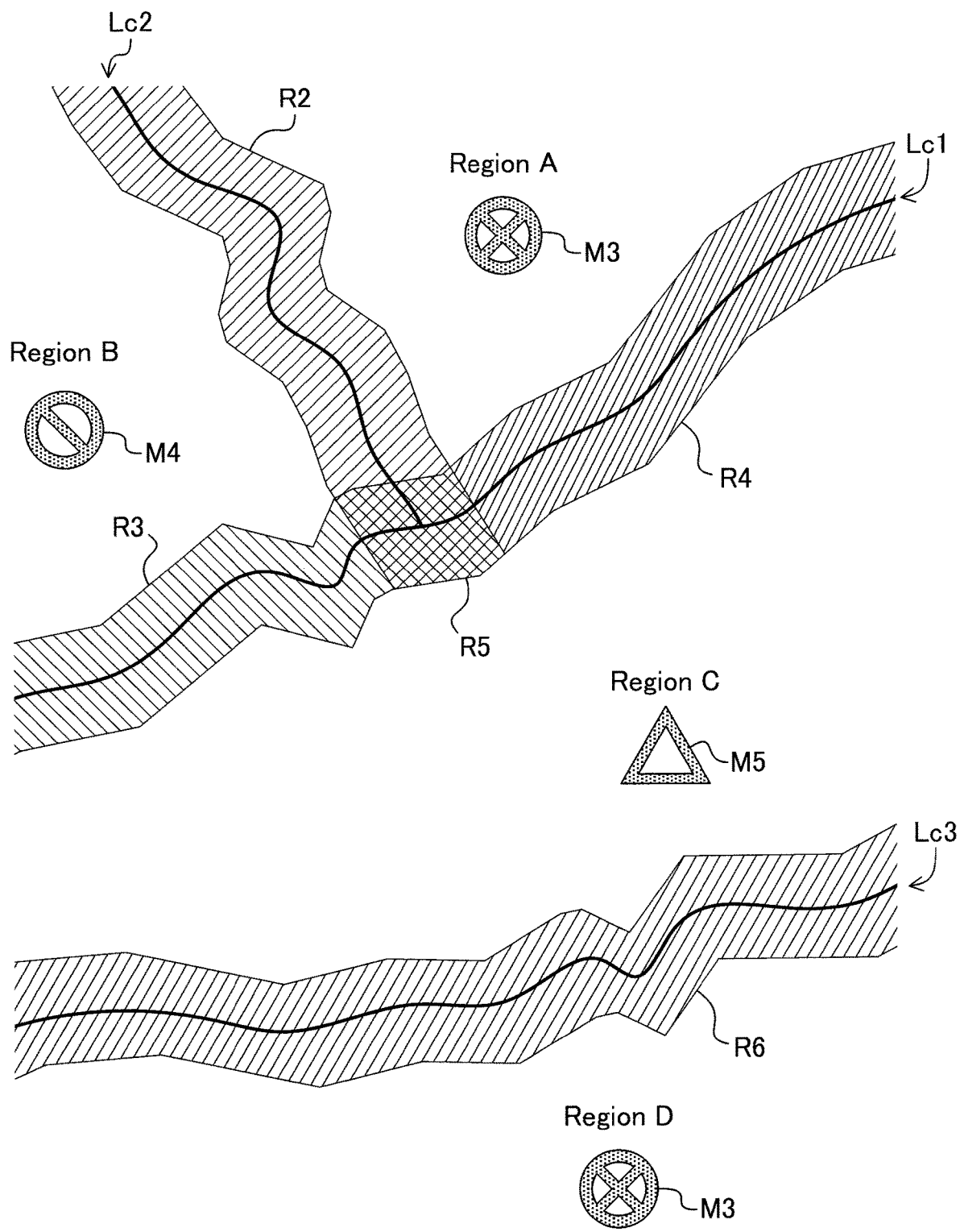
FIG. 4 is an example of boundaries of the regions, the boundary zones and the information-for-determining-region.

Another example of the boundary zone is shown in FIG. 4. In the example shown in FIG. 4, an area corresponding to an upper space of the paper is divided into a region A, a region B and a region C by a curved line Lc1 and a curved line Lc2. In addition, an area corresponding to a lower space of the paper is divided into the region C and a region D by a curved line Lc3.

Each of a region R2, a region R3, a region R4, a region R5, and a region R6 is the boundary zone. The candidate regions with respect to the region R2 are the region A and the region B. The candidate regions with respect to the region R3 are the region B and the region C. The candidate regions with respect to the region R4 are the region A and the region C. The candidate regions with respect to the region R5 are the region A, the region B and the region C. The candidate regions with respect to the region R6 are the region C and the region D.

The information-for-determining-region associated with the region A is a traffic sign M3 shown in FIG. 4. The information-for-determining-region associated with the region B is a traffic sign M4. The information-for-determining-region associated with the region C is a traffic sign M5.

The information-for-determining-region associated with the region D is a traffic sign M3 that is in common with the sign used in the region A.

For example, when the obtained position Pn is included in the region R5, the ECU 20 determines whether or not any one of the traffic sign M3, the traffic sign M4, and the traffic sign M5 is contained in the front image. When the ECU 20 determines that any one of the traffic signs is contained in the front image (i.e., any one of the traffic signs is detected), the ECU 20 determines that the travelling region St is the same as the candidate region corresponding to the detected traffic sign.

As understood from FIG. 4, there may be more than two candidate regions corresponding to the single boundary zone. In addition, as understood from the case where the traffic sign M3 is the information-for-determining-region associated with both the region A and the region D, the single piece of the information-for-determining-region may be associated with a plurality of the candidate regions which are not adjacent to each other.

(Driving Assistance Processes Corresponding to Travelling Region)

As described above, the ECU 20 executes the driving assistance processes for assisting the driver to drive the vehicle 10 on the basis of the travelling region St.

One of the driving assistance processes is a process for displaying a numeral indicating the vehicle speed Vt together with a unit of speed (speed unit) on the display 41. More specifically, the ECU 20 determines the speed unit (namely, either kilometers per hour or miles per hour) of the vehicle speed Vt used in the travelling region St on the basis of the acquired travelling region St. Furthermore, the ECU 20 converts the vehicle speed Vt into a speed represented using the determined speed unit, and displays that converted speed together with the speed unit on the display 41.

For example, when the travelling region St corresponds to a region in which kilometer is used as the distance unit (as an example, Ireland), the ECU 20 displays the vehicle speed Vt in kilometer(s) per hour (km/h) on the display 41. When the travelling region St corresponds to a region in which mile is used as the distance unit (as an example, the United Kingdom), the ECU 20 displays the vehicle speed Vt in mile(s) per hour (mi/h) on the display 41.

Furthermore, the ECU 20 executes a process called a "traffic sign recognition (TSR)" as the driving assistance process. When a predetermined traffic sign used (placed) in the travelling region St is detected from the front image while the ECU 20 is executing the traffic sign recognition, the ECU 20 displays a symbol that represents that detected traffic sign on the display 41.

In addition, the ECU 20 executes a process for generating an alert for notifying the driver of exceeding a speed limit as the driving assistance process. More specifically, when a speed limit sign which only indicates a numeral (without the speed unit) is detected from the front image, the ECU 20 determines the speed unit (namely, either kilometers per hour or miles per hour) for the numera indicated by the detected speed limit sign on the basis of the travelling region St, and converts the vehicle speed Vt into a speed represented using the determined speed unit. Furthermore, if the converted vehicle speed (i.e., the vehicle speed Vt) is greater than the speed limit indicated by the detected speed limited sign, the ECU 20 generates the alert for notifying the driver of exceeding the speed limit through the display 41 and the speaker 42.

(Specific Operation)

Next, specific operation of the ECU 20 will be described. The CPU 21 (hereinafter, also referred to as "the CPU" for simplification) of the ECU 20 executes a "travelling region determination processing routine" represented by a flowchart shown in FIG. 5 every time a predetermined time elapses.

Figure 5:
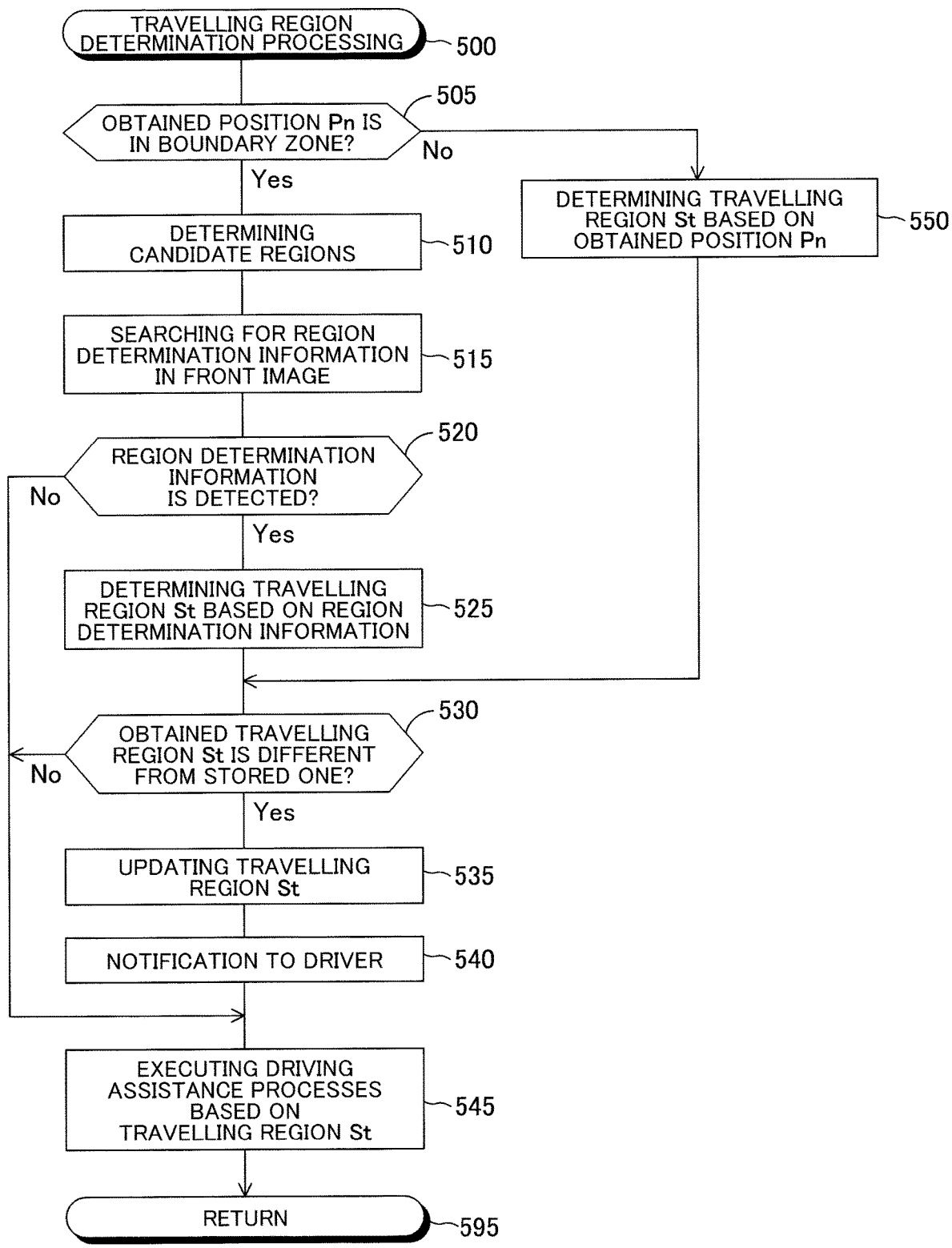
FIG. 5 is a flowchart representing a travelling region determination processing routine executed by the present control apparatus.

Therefore, when an appropriate timing has come, the CPU starts the process from step 500 of FIG. 5 and proceeds to step 505 so as to determine whether or not the obtained position Pn is included in the boundary zone on the basis of the obtained position Pn and "regional information." Notably, the following information described above has been stored in advance as the regional information in the non-volatile memory 22 of the ECU 20.

Positional information of the reference points (namely, information for defining the boundary zones);
Information on the candidate regions which are associated with the boundary zone;
Information for defining the center regions; and
Information-for-determining-region associated with the candidate regions.

When the obtained position Pn is not included in the boundary zone (i.e., the obtained position Pn is included in the center region), the CPU makes a "No" determination in step 505 and proceeds to step 550 so as to determine that the travelling region St at the present (current) time is a region corresponding to the obtained position Pn (i.e., the travelling region St is a region corresponding to the center region in which the obtained position Pn is included).

Subsequently, the CPU proceeds to step 530 so as to determine whether or not the last obtained (i.e., newest) travelling region St is different from the travelling region St that has already been stored in the non-volatile memory 22. If the last obtained travelling region St is not different from the travelling region St already stored in the non-volatile memory 22 (i.e., the travelling region St has not changed), the CPU makes a "No" determination in step 530 and proceeds to step 545 directly. In step 545, the CPU executes the driving assistance processes described above on the basis of the travelling region St stored in the non-volatile memory 22. Subsequently, the CPU proceeds to step 595 directly so as to end the present routine.

In contrast, the last obtained travelling region St is different from the travelling region St that has already been stored in the non-volatile memory 22, the CPU makes a "Yes" determination in step 530 and proceeds to step 535 so as to update the travelling region St using the last obtained travelling region St. Namely, at step 535, the CPU stores the last obtained travelling region St in the non-volatile memory 22.

Subsequently, the CPU proceeds to step 540 so as to inform the driver that the travelling region St has just changed, using a symbol displayed on the display 41 and a voice message generated from the speaker 42. Thereafter, in step 545, the CPU executes the driving assistance processes on the basis of the updated travelling region St, and then, proceeds to step 595 so as to terminate the present routine tentatively.

Whereas, when the obtained position Pn is included in the boundary zone, the CPU makes a "Yes" determination in step 505 and proceeds to step 510 so as to determine (obtain) the candidate regions corresponding to the boundary zone in which the obtained position Pn is included. Subsequently, the CPU proceeds to step 515 so as to search for the pieces of the information-for-determining-region (e.g., information of the traffic sign) associated with the determined candidate regions in the last obtained front image. Namely, the CPU searches for (looks up) an area (image range) similar to any one of the regions associated templates corresponding to the candidate regions contained in the latest front image.

Furthermore, the CPU proceeds to step 520 so as to determine whether or not one of the pieces of the information-for-determining-region has successfully been detected in the latest front image. Specifically, the CPU determines whether or not the image range similar to one of the regions associated templates corresponding to the candidate regions has successfully been detected (found out).

If any one of the pieces of the information-for-determining-region has not been detected, the CPU makes a "No" determination in step 520 and proceeds to step 545, and then, proceeds to step 595 directly. Accordingly, in this case, the travelling region St stored in the non-volatile memory 22 is not changed.

In contrast, if one of the pieces of the information-for-determining-region has been detected, the CPU makes a "Yes" determination in step 520 and proceeds to step 525 so as to determine that the travelling region St at the present time is a region corresponding to the detected piece of the information-for-determining-region (i.e., one of the candidate regions).

Subsequently, the CPU proceeds to step 530. In step 530, if the last obtained travelling region St determined in step 525 is not different from the travelling region St hat has already stored in the non-volatile memory 22, the CPU makes a "No" determination in step 530 and proceeds to step 545, and then, proceeds to step 595 directly.

Whereas, if the last obtained travelling region St determined in step 525 is different from the travelling region St that has already been stored in the non-volatile memory 22, the CPU stores the last obtained travelling region St in the non-volatile memory 22 to updated the travelling region St stored in the non-volatile memory 22 in step 535. Thereafter, the CPU informs the driver that the travelling region St has just changed in step 540. In addition, in step 545, the driving assistance processes are executed on the basis of the updated travelling region St.

As having been described, according to the present control apparatus, an occurrence the erroneous determination of the travelling region St due to the error in obtaining the obtained position Pn can be avoided. In addition, according to the present control apparatus, a case where a time period from a point in time when the travelling region St is actually changed to a point in time when the travelling region St stored in the non-volatile memory 22 is updated becomes excessively long is unlikely to occur, by means of determining the travelling region St on the basis of the front image. As a result, the present control apparatus can appropriately execute the driving assistance processes (for example, displaying vehicle speed Vt on the display 41 and the traffic sign recognition) corresponding to the travelling region St.

Furthermore, since the boundary zone is defined by a set of line segments connecting the reference points, the capacity of the non-volatile memory 22 for storing the information-for-determining-region can be smaller as compared with a case where information for defining the actual boundary lines of regions including complex curved lines is stored.

The embodiment of the vehicle control apparatus (travelling region determination apparatus) according to the present disclosure has been described; however, the present disclosure is not limited to the above-described embodiment, and various modifications are possible without departing from the scope of the disclosure. For example, the positioning signal receiver 33 according to the present embodiment receives the positioning signal transmitted by the GPS satellite and obtains the obtained position Pn on the basis of the received positioning signal. However, the positioning signal receiver 33 may be configured to receive the positioning signal of a satellite positioning system different from the GPS satellite (for example, Galileo, BeiDou and GLONASS).

In addition, the regions shown in FIG. 2 are the United Kingdom and Ireland. I.e., the boundary zone related to this example includes the international border line. However, the boundary zone stored by the ECU 20 as the boundary zone information may include a border line different from an international border line. For example, the boundary zone may be defined to include a state border of the states of which the United States consists. In this case, when the vehicle 10 travels in the United States, any one of the states of which the United States consists is determined to be the travelling region St.

In addition, according to the present embodiment, the boundary zone is defined by a set of line segments connecting the reference points. However, the boundary zone may be defined by a method different from the above. For example, the boundary zone may be defined by a Bezier curve of which each of the reference points is a control point.

In addition, according to the examples shown in FIGS. 2 and 4, the number of the piece of the information-for-determining-region (specifically, the region associated templates) associated with each of the candidate region is "1." However, multiple pieces of the information-for-determining-region may be associated with a single candidate region.

Figure 3B:
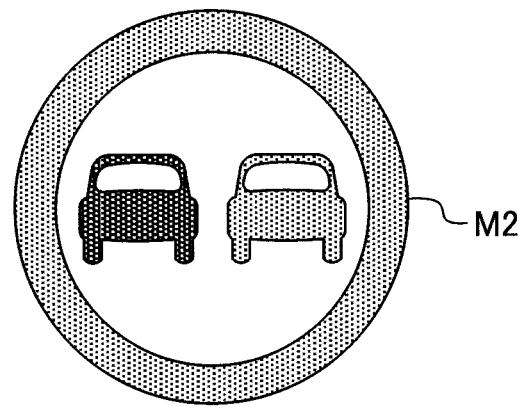
FIG. 3B is a diagram indicating information-for-determining-region associated with Ireland.

In addition, the information-for-determining-region shown in FIGS. 3A and 3B as examples are the "no overtaking" signs (i.e., traffic signs). However, the information-for-determining-region may correspond to an object different from a traffic sign. For example, the information-for-determining-region associated with a region may be a characteristic delineator (specifically, optical characteristics of that delineator) which is not used in other regions adjacent to that region. In addition, the information-for-determining-region associated with a region may be a signboard of a shop which is deployed in that region but is not located (placed) in other regions adjacent to that region. Furthermore, the information-for-determining-region associated with a region may be specific characters (specifically, characters specific to a language used in that region) which are not used in other regions adjacent to that region.

In addition, the ECU 20 according to the present embodiment executes the processes such as displaying the vehicle speed Vt and the traffic sign recognition for assisting the driver to drive the vehicle 10 as the driving assistance processes. However, the driving assistance process may be a process for making (letting) the vehicle 10 travel along a predetermined route (i.e., autonomous/automatic driving process). In this case, the ECU 20 may be configured to autonomously control a travel state of the vehicle 10 (for example, the vehicle speed Vt and a steering angle of the vehicle 10) so as not to violate traffic rules (regulations) in the determined travelling region St.

The functions provided (realized) by the ECU 20 according to the present embodiment may be provided by a plurality of ECUs. Furthermore, the ECU 20 may be implemented as an apparatus included in a body of the camera apparatus 32. Alternatively, a part of the ECUs which provide the functions of the ECU 20 according to the present embodiment may be implemented in the body of the camera apparatus 32.

What is claimed is:

1. A vehicle control apparatus comprising:
a position signal receiver for receiving a positioning signal from a positioning satellite for determining a position of a vehicle;
a camera for obtaining a front image by photographing an area in front of said vehicle; and
a control unit implemented by at least one programmed processor and configured to:
determine, based on an obtained position of said vehicle and said front image, a travelling region in which said vehicle is travelling among a plurality of regions into which an area is divided by a predetermined boundary line, said obtained position being a position obtained using said positioning signal received by said position signal receiver;
execute a driving assistance process in accordance with said travelling region which has been determined;
wherein said control unit is configured to:
have stored, in advance, boundary zone information and plural pieces of information-for-determining-region, said boundary zone information defining a boundary zone that is a zone including said predetermined boundary line, and each piece of said information-for-determining-region being associated with one of said regions having a portion of said one of said regions overlapping said boundary zone; determine whether said obtained position is included in said boundary zone on a basis of said boundary zone;
determine that said travelling region is a region based on said obtained position when said obtained position is not included in said boundary zone;
determine that said travelling region is a region associated with a piece of said information-for-determining-region included in said front image when said obtained position is included in said boundary zone; and
autonomously control a travelling speed and steering angle of the vehicle travelling in the determined said travelling region.

2. The vehicle control apparatus according to claim 1, wherein said control unit is configured to have stored information on a plurality of positions of reference points for defining said boundary zone as said information-for-determining-region.

3. The vehicle control apparatus according to claim 1, wherein said control unit is configured to have stored information representing traffic signs indicating traffic regulations as said information-for-determining-region, wherein one of said traffic signs is used in one of said regions having a portion of said one of said regions overlapping said boundary zone and has a design different from a design of another one of said traffic signs used in another one of said regions having a portion of said one of said regions overlapping said boundary zone.

4. The vehicle control apparatus according to claim 1, wherein said control unit is configured to execute a process for indicating the travelling speed of said vehicle on a display apparatus installed on said vehicle together with a unit of speed employed in said determined travelling region in said driving assistance process.

* * * * *